(12) United States Patent
Hanson

(10) Patent No.: US 7,926,716 B2
(45) Date of Patent: Apr. 19, 2011

(54) POINT-OF ORIGIN STORE AND METHOD OF SELLING MERCHANDISE ON A POINT-OF-ORIGIN BASIS

(75) Inventor: Karl G. Hanson, Medina, MN (US)

(73) Assignee: Localmakers.com Inc., Hamel, MN (US)

( * ) Notice: Subject to any disclaimer, the term of this patent is extended or adjusted under 35 U.S.C. 154(b) by 1226 days.

(21) Appl. No.: 11/538,590

(22) Filed: Oct. 4, 2006

(65) Prior Publication Data

US 2008/0116265 A1   May 22, 2008

(51) Int. Cl.
*G06K 5/00* (2006.01)
(52) U.S. Cl. .......................................... 235/383; 235/380
(58) Field of Classification Search .................. 235/383, 235/385; 705/10, 14.11, 14.2, 14.39, 14.4, 705/14.49, 14.57, 14.58
See application file for complete search history.

(56) References Cited

U.S. PATENT DOCUMENTS

| 5,960,411 | A | | 9/1999 | Hartman et al. | |
|---|---|---|---|---|---|
| 5,970,472 | A | | 10/1999 | Allsop et al. | |
| 6,125,352 | A | * | 9/2000 | Franklin et al. | 705/26 |
| 6,154,738 | A | | 11/2000 | Call | |
| 2001/0034660 | A1 | * | 10/2001 | Heumann | 705/26 |
| 2001/0051901 | A1 | | 12/2001 | Hager et al. | |
| 2002/0103700 | A1 | * | 8/2002 | Gathy | 705/14 |
| 2002/0116287 | A1 | * | 8/2002 | Schubert et al. | 705/26 |
| 2003/0182208 | A1 | * | 9/2003 | Dupuis et al. | 705/27 |
| 2004/0117263 | A1 | * | 6/2004 | Gieselmann et al. | 705/26 |
| 2006/0218244 | A1 | * | 9/2006 | Rasmussen et al. | 709/218 |
| 2007/0043627 | A1 | | 2/2007 | Cooperman | |
| 2008/0208718 | A1 | | 8/2008 | Hanson | |

OTHER PUBLICATIONS

*U.S. Department of Labor Bureau of Labor Statistics Occupational Outlook Handbook* [available on the Internet Oct. 8, 2007] <http://stats.bls.gov/oco/ocos023.htm>.
Edmonton Group has Bright Idea for 'for your home', Edmonton Journal (Sep. 3, 2004).

* cited by examiner

*Primary Examiner* — Thien M Le
(74) *Attorney, Agent, or Firm* — Karl G. Hanson

(57) ABSTRACT

The new store that includes a building that contains merchandise that was purchased by the store on a point-of-origin basis. The merchandise preferably is marketed for sale to consumers in such a way that there is consumer awareness in regard to the origin of the merchandise. The new store presents an alternative to conventional stores that focus mainly on price when other attributes are similar. The store may also include an on-line enterprise that locates locally-made merchandise for potential customers. By using a point-of-origin basis for buying and selling merchandise, the present invention provides consumers with a store where they can quickly locate and purchase merchandise that is made closer to their residence.

20 Claims, 6 Drawing Sheets

POINT-OF ORIGIN STORE AND METHOD OF SELLING MERCHANDISE ON A POINT-OF-ORIGIN BASIS

The present invention pertains to a new store that stocks and sells merchandise on a point-of-origin basis so that locally made merchandise can be more readily found by consumers. The present invention also includes a new method of selling merchandise using such a basis.

BACKGROUND

Essentially all major stores that operate commercially in the United States today buy and sell merchandise on a "price basis". That is, all other things being equal, the purchasing operations of the store look to buy the merchandise that they sell at the lowest possible price. This method of purchasing merchandise allows the store to have larger profit margins, while also passing on lower prices onto its customers. Under this type of strategy, the store can remain competitive and, of course, commercially viable. Although this priced-based method of buying and selling merchandise can be beneficial to the consumer from the standpoint of providing economic cost savings at the point of purchase, it nonetheless does present other drawbacks.

Central to these drawbacks is that a priced-based purchasing strategy neglects other factors that are important to many consumers. In today's global economy, merchandise can be manufactured in locations far from the point-of-sale to the consumer. Many products that are presently sold in the United States are made, for example, in China. When the merchandise is made on the other side of the world, the consumer has little or no familiarity with the manufacturer or any of its employees. The consumers therefore may have difficulty in knowing whether they are buying merchandise from a reputable manufacturer that treats its employees fairly. Consumers also cannot be certain whether the manufacturer is respecting environmental and intellectual property laws or whether such laws reside in the country-of-origin on a sound, fair, and enforceable foundation. The merchandise could be made in a country that does not provide adequate protection for patents and copyrights or that does not fairly engage in trade with the country in which the merchandise is sold to consumers. The merchandise that is offered for sale could be known as "pirated" merchandise. Further, the value of the currency in the nation of manufacture also could be pegged at a low value relative to the currency in the nation in which the goods are sold, making the products seem inexpensive to the purchasers. Additionally, if the manufacturer negligently or intentionally makes a defective product that harms the consumer, the consumer may not have sufficient legal recourse against the manufacturer to receive adequate compensation. There also are substantial fossil fuel resource requirements, which are needed to ship merchandise from far-off manufacturing locations to local stores. Consumer concerns regarding conservation and the published effects of excessive greenhouse gases on global warming are neglected when merchandise is purchased on a price basis. Finally, a sizable portion of a consumer's money becomes transferred to entities and persons located in far-away places where the money spent may not come back to benefit the purchaser. The local community can suffer from sizable losses in tax revenue when manufacturing jobs are located elsewhere. If, however, a person can buy a locally manufactured product, the money spent has greater tendency to stay in the local economy, providing jobs and other benefits to the community. Research and development (R&D) efforts also tend to maintain a close tie to manufacturing, and thus when manufacturing operations are displaced, R&D jobs may also follow.

The United States Department of Labor, Bureau of Labor Statistics (BLS) defines the job of a firm's "purchaser" as one who "makes up a key component of a firm's supply chain." Purchasing professionals attempt to get the best deal for their company, meaning the highest quality merchandise and services at the lowest possible cost. In so doing, the BLS states that "[p]urchasing professionals consider price, quality, availability, reliability, and technical support when choosing suppliers and merchandise." The BLS further indicates that "[i]n order to accomplish these tasks successfully, purchasing managers, buyers, and purchasing agents study sales records and inventory levels of current stock, identify foreign and domestic suppliers, and keep abreast of changes affecting both the supply of, and demand for, needed products and materials." One particular type of purchaser is described as a "wholesale and retail buyer". This type of purchaser buys merchandise, such as clothing or electronics, for resale. In regard to wholesale and retail purchasers, the BLS goes into further detail:

> Wholesale and retail buyers are an integral part of a complex system of distribution and merchandising that caters to the vast array of consumer needs and desires. Wholesale buyers purchase merchandise directly from manufacturers or from other wholesale firms for resale to retail firms, commercial establishments, institutions, and other organizations. In retail firms, buyers purchase merchandise from wholesale firms or directly from manufacturers for resale to the public. Buyers largely determine which products their establishment will sell. Therefore, it is essential that they have the ability to predict what will appeal to consumers. They must constantly stay informed of the latest trends, because failure to do so could jeopardize profits and the reputation of their company. They keep track of inventories and sales levels through computer software that is linked to the store's cash registers. Buyers also follow ads in newspapers and other media to check competitors' sales activities, and they watch general economic conditions to anticipate consumer buying patterns. Buyers working for large and medium-sized firms usually specialize in acquiring one or two lines of merchandise, whereas buyers working for small stores may purchase the establishment's complete inventory.

Although the BLS describes much about what a wholesale and retail buyer considers before making purchases for the firm, nothing is stated about considering point-of-origin as a factor in making purchasing decisions for retail firms. This is particularly noteworthy in that the BLS states that these "[firm] [b]uyers stay in constant contact with store and department managers to find out what products are selling well and which items the customers are demanding to be added to the product line." See http://stats.bls.gov/oco/ocos023.htm. Point-of-origin of manufacture, albeit important for the reasons stated above, is not mentioned by the United States Department of Labor as being a factor that is taken into consideration by the professionals who make purchases for stores operating in the United States.

SUMMARY

The present invention provides a new store and a new method of buying and selling merchandise.

In one embodiment, the new store comprises a building that contains merchandise that was purchased by the store on a point-of-origin basis. The merchandise preferably is marketed for sale to consumers in such a way that there is consumer awareness in regard to the origin of the merchandise. The new store presents an alternative to conventional stores that focus mainly on price when other attributes are generally similar. By using a point-of-origin basis for buying and selling merchandise, the present invention provides consumers with a store where they can go shop to buy merchandise that is more closely intertwined in the economy where they reside.

In another embodiment, the present invention comprises an online store that comprises a website that offers a variety of merchandise for sale to consumers through electronic interface with the website. The online store offers for sale at least at a variety of merchandise that has been manufactured by at least a plurality of manufacturers. The variety of merchandise is made available to the consumer for purchase on the website such that locally made items of a particular product type are brought to the attention of the consumer relative to the consumer's residence information and in response to a consumer inquiry for the particular product type.

In yet another embodiment, the online store comprises:

(a) a store hub;

(b) an electronic interface with online consumers via a website, which interface is capable of transmitting an online consumer inquiry regarding one or more product types that a consumer is interested in purchasing from the online store to the store hub and is capable of responding to the inquiry with information pertaining the product type(s) that are offered for sale online; and (c) an electronic interface with a database that contains information pertaining to at least a super-multiple of product types and the location of manufacture of the super-multiple of product types, the electronic interface being capable of furnishing the store hub with information that includes locally made products of the kind that the consumer has inquired about;

wherein the store hub will, via the electronic interface with the consumer at the website, or via an e-mail, respond to the consumer inquiry regarding the one or more product types with product type information that includes the product(s) brands that are available for sale from the online store and the location of manufacture these brands such that the consumer has the ability to select a locally made product for purchase.

In another embodiment the present invention includes a new method of buying and selling merchandise for retail consumption, which method comprises: (a) purchasing merchandise wholesale on a point-of-origin basis and on a tiered basis; (b) advertising the purchased merchandise for sale, wherein the advertisement notes that the purchased merchandise offered for sale includes locally made products; and (c) selling the purchased merchandise to consumers retail.

The present invention is beneficial in that it gives consumers greater opportunity to use their purchasing power to promote local manufacture when buying the merchandise that they need for their everyday lifestyles. Presently, consumers can check the merchandise labels to determine the point of manufacture of the product at hand. When shopping in a particular store, however, the consumer unfortunately finds, more-often-than-not, that the particular merchandise that is being offered for sale is not made locally. The purchase of locally-made products, therefore, requires that the consumers try multiple outlets. The consumer must undertake such a task or defer making the purchase until they stumble upon a locally-made product of the kind that suits them. Neither option, of course, is particularly appealing to the consumer. Consumers therefore find themselves frustrated in having to buy merchandise made by manufacturers located in faraway places. Accordingly, the present invention seeks to eliminate this particular problem by providing the consumer with a store whereby the point-of-origin research is done by purchasing professionals or agents of the store. The consumer, therefore, can go to one building or to a website to find locally made merchandise of the particular kind that the consumer desires to own.

In practice, the present invention may provide consumers with an opportunity to quickly locate locally made merchandise items of a particular product type, rather than a variety of foreign made products, when making their purchases. In so doing, the consumer will have, for the first time, an instrumental means of using their purchasing power to help keep manufacturing jobs local to benefit the local tax base and the economic well-being of their neighbors. Consumers also may have greater opportunity to familiarize themselves with the manufacturer, its treatment of its employees, its respect for environmental and intellectual property laws and may have better recourse against a manufacturer that produces a harmfully defective product. The consumer also may take pleasure in knowing that less hydrocarbon fuels are consumed when transporting merchandise from the point of manufacture to the point of sale. Further, high paying research and development jobs may be created locally as a result of keeping the manufacturing close, further benefiting the local economy.

These and other advantages of the presence invention are more fully shown and described in the drawings and detailed description of this invention. The drawings and description, however, are for the purposes of illustration only and should not be read in a manner that would unduly limit the scope of this invention.

GLOSSARY

In describing the present invention, the terms used in this document will have the meanings as set forth below:

"building" means a structure that has a floor, a roof, and one or more doors through which people can pass to enter and exit;

"consumer" means a purchaser who is part of the general public and who makes selected retail purchases on behalf of him or herself or their family and friends;

"consumer appeal" means that the marketplace trends show that more consumers are buying that particular product type even though these are other generally equal items similarly available;

"department" means an area within a building of a store, which area generally offers for sale merchandise items of one particular generic classification;

"extended multiple" means greater than 25;

"food" means things that are prepared for being eaten by persons;

"geographic area or region" means a geographic category such as the confines of a town or city border, a county border, a state border, a defined regional area (for example, southwestern United States), a province, a nation, a continent, a hemisphere, and any other defined or designated geographic area, whether defined or designated by a government or business or combination thereof;

"generally equal" means designed for and capable of performing the same general function (for example, two different pairs of blue jeans, which are made by two different companies, are considered to be generally equal);

"geographically closer" means located generally closer distance-wise, or located in a closer geographic area, unless being separated by a significant geographic barrier such as a mountain range or large body of water;

"for sale" means offering a change in ownership in exchange for money or its equivalent;

"location of manufacture" means the place(s) where the merchandise is made, either partially or completely;

"locally made" means that a particular product is manufactured in whole or in part, in a geographic area that is located geographically closer to the location of the store's building (if the store completes the sale of merchandise at a checkout station in the building) or the residence information of the consumer (if the store is an online store or a mail order store) when compared to the location of manufacture of other generally equal items of merchandise;

major consideration" means the predominant factor when considering the purchase of one or more items amongst other generally equal items;

"merchandise" means retail items other than food and produce;

"multiple" means more than ten;

"plurality" means two or more;

"point-of-origin basis" means giving consideration to the location of manufacture of a particular item;

"point of sale" means the location of the building if the purchase transaction occurs by the consumer entering the building and buying the item at a check-out station or the consumer residence information if the store is an online store or a mail order store;

"point system" means a system or method whereby a ranking is provided to a particular item(s) of merchandise so that consumers, when seeing or reading the ranking, can easily understand the degree to which persons within a certain geographic area contributed to the item(s) of merchandise;

"produce" means plants or animals or portions thereof that are grown or raised for human consumption;

"primary consideration" means being a major consideration plus being the predominant factor even when another generally equal product types may have superior quality or consumer appeal;

"product brand" means a brand that acts as a source of identifier of the manufacturer, the product, or a combination thereof;

"product type" means a particular item of merchandise designed for a particular use, for example, a running shoe (as opposed to simply a shoe), a basketball (as opposed to simply a ball), a wineglass, a blender, toilet paper, a etc.;

"purchase, purchases, purchased, or purchasing", in reference to a store, means taking possession, ownership, or control of an item in any way or fashion (e.g. buying, leasing, on loan, acting as a bailee) or acting as a middleman or selling agent (e.g., conduit, etc.) of a particular item(s) or items such that those item(s) can be offered for sale to others;

"purchase, purchases, purchased, or purchasing", in reference to a consumer, means taking ownership of the item(s) in exchange for payment of money or its equivalent;

"purchasing agent" means a person or persons or computer program or combination thereof, which is responsible for purchasing items for or on behalf of a store;

"ranking" means at least a plurality of designations (other than "made in _____") which designations express a level of human contribution that includes human contribution factors in addition to manufacturing location;

"residence information" means one or more items of information furnished by the consumer, which item(s) of information are pertinent to where the consumer lives all or part of the time;

"retail" means transactions where purchases are made by individual consumers;

"store hub" means a physical and/or electronic place (or places) where activity of the business transpires;

"store" means a business that sells or offers to sell retail merchandise;

"super-extended multiple" means greater than 500;

"super-multiple" means greater than 100;

"super-variety of merchandise" means that the available merchandise encompasses at least a super-extended multiple of different product types, which super-extended multiple of different product types are manufactured by at least an extended multiple of different manufacturers;

"tiered basis" means that the items purchased by the store are done in such a fashion that the purchasing agent desires to purchase merchandise in a first geographic region over merchandise in a second geographic region;

"variety of merchandise" means that the available merchandise encompasses at least a multiple of different product types, which multiple of different product types are manufactured by at least a plurality of different manufacturers;

"volume wise" means calculated on a numerical basis; and

"wholesale" means transactions where purchases are made by a store(s).

DETAILED DESCRIPTION OF PREFERRED EMBODIMENTS

In describing different embodiments of the invention, specific terminology is generally used for the sake of clarity. The invention, however, is not intended to be limited to the specific terms so selected, and each term so selected includes all technical equivalents that operate similarly.

In the practice of the present invention, a new store is provided that comprises a building and merchandise that is for sale within the building, wherein the merchandise that is for sale was purchased by the store on a point-of-origin basis. The inventive store may purchase merchandise such that locally made merchandise is available for purchase by the consumer. The purchases may be made from the merchandise manufacturer or from a wholesale firm or from a combination thereof or from any other suitable source. In considering the term "purchase" (and variations thereof) in the context of a store making purchases according to the invention, the store purchases do not have to be made by an actual employee of the store but could be made by another person or third-party acting on behalf of the entity that owns the store. Therefore, when this document makes reference to the "store making purchases", in one form or another, the purchases do not actually have to be made by the store itself or an employee or purchasing agent of the store to qualify as a purchase made by the store.

Figure 1:
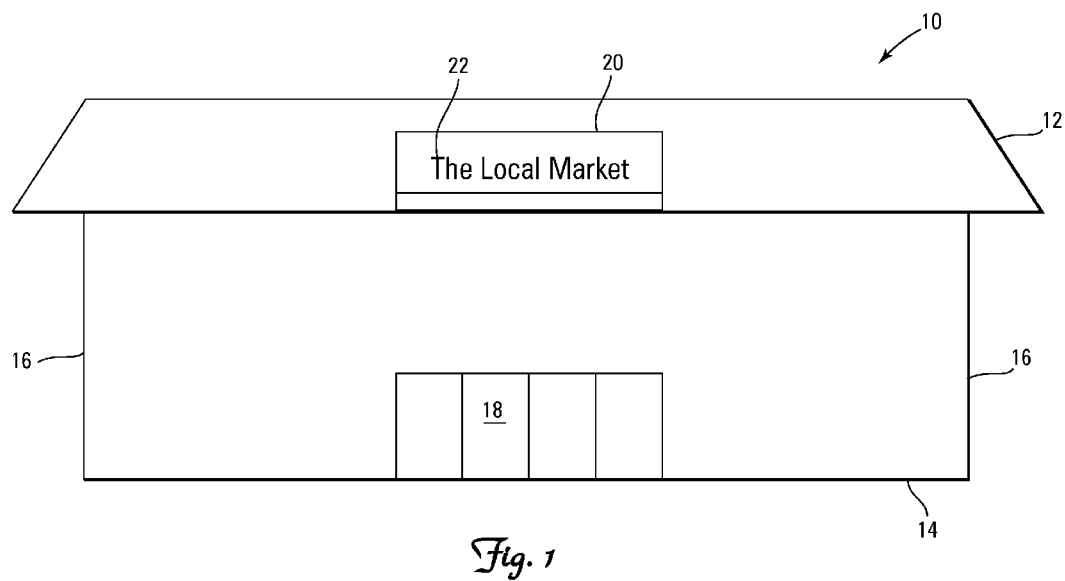
FIG. 1 is a front view of a store 10 in accordance with the present invention.

FIG. 1 shows an example of a store 10 that has a roof 12, a floor 14, walls 16, and one or more doors 18. On the front of the store 10 is a sign 20 that contains indicia 22, suggesting or indicating that the store sells locally made goods. The indicia may also highlight the name of the store in this case "The Local Market". There may be other signs or postings near the entrance or within the store, which inform the consumer that the store sells locally made merchandise, purchased on a point-of-origin basis. Of course, the store would probably not use the literal phrase "point-of-origin basis" in conveying this information to the consumer. This invention is intended to encompass all other wordings, phrases, and/or representations that convey to the consumers that the store uses such a basis in obtaining the merchandise that it sells. The store can also place advertisements in the newspaper, magazines, and/or on the Internet. The advertising could be in the form of brochures, flyers, or literature. The advertising could, for example, state that the store attempts to stock goods made by local manufacturers or manufacturers within a designated geographic area. The advertising could explain that the store first attempts to buy merchandise that is made within the city or town in which the store is located. If the particular merchandise that the store is searching for is not made in that particular city or town, then the store may expand the search into the county in which the store is located. If that search is unsuccessful, then the store may further expand the geographic area to the state within which the store building is located. If the store still cannot find the particular merchandise that it would like to offer for sale in that particular state, the store may look to states that are adjacent to or border upon the state within which the store building is located. If the store cannot find the particular merchandise within the adjacent states, then the store could expand the search into a larger region such as the Upper Midwest. If the store building is located, for example, in Minnesota and the desired merchandise could not be found in Wisconsin, Iowa, or North and South Dakota, the Upper Midwest could be defined to include those mentioned states plus Michigan and Illinois. If the goods cannot be found within the Upper Midwest, then the search could be expanded to include the states that border the Upper Midwest. And if that search is not successful, then the store could try to find the appropriate goods within the whole United States of America. If the store cannot find the particular goods manufactured in the USA, then the store would attempt to purchase the goods in North America (that is, in Canada, the USA, and Mexico). If the search in North America is unsuccessful, than the store would look to Central America in its attempt to find the merchandise. If the merchandise still could not be found in Central America, then the store would look to South America or the Western Hemisphere. Even if merchandise is located in the first geographic area, the store may continue its search into a second geographic area so that a plurality or variety of merchandise can be made available to the consumer. The number of products of a particular product type that the store would like to make available may vary depending on product type and the number of manufacturers available to make those product types within a specified geographic area.

Such a purchasing strategy, whereby one geographic region is given priority over another, is referred to in this document a "tiered basis". A tiered basis strategy includes two or more tiers, and may include up to about 10 to 15 tiers. A common tiered basis strategy could include about three to seven tiers. The tiered basis purchasing strategy could also include a "fair trade" strategy, whereby if the merchandise could not be located in the nation or continent of origin, for example, the United States or North America, then the store would consider nations that meet a predefined definition for being "fair traders". This definition could be defined by the store itself or by another entity such as the Commerce or State Department. The purchasing strategy of the store could include a guideline, mandatory or otherwise, whereby only products made within a certain geographic area are attempted to be purchased, for example, only product types made in the United States, in whole or in part, are attempted to be purchased for resale. If those product types can not be located as being so made in the United States, then the store would only purchase from venues that meet a certain definition such as "fair trader", "good environmental steward", etc. Such a guideline could similarly be a mandatory selling strategy for the store. In an online store, the purchaser could be offered the opportunity to override this guideline if a particular product is desired notwithstanding its failure to meet the guideline. In a store that has a building, locally made merchandise could be placed on the shelves adjacent to generally equal merchandise that is not locally made or is made in another nation or continent. The purchasing strategy of the store could also include a guideline, mandatory or otherwise, whereby if a particular product was not able to be located as being made, in whole or in part, in the first geographic area, such as the United States, then the store would look to buy merchandise from a company that has a significant presence in this or another designated geographic area. What is meant by "significant presence" is a defined business operation. The business operation could be defined to include companies that have headquarters, that have more than "x" employees, and/or that have at least "y" % of their employees in the selected geographic area, where "x" and "y" could independently be defined as being for example, 5, 10, 15, 20, 25, 30, 40, 50, 60, 70, 80, or 90. The value of "x" could even be 100 or greater.

Figure 2:
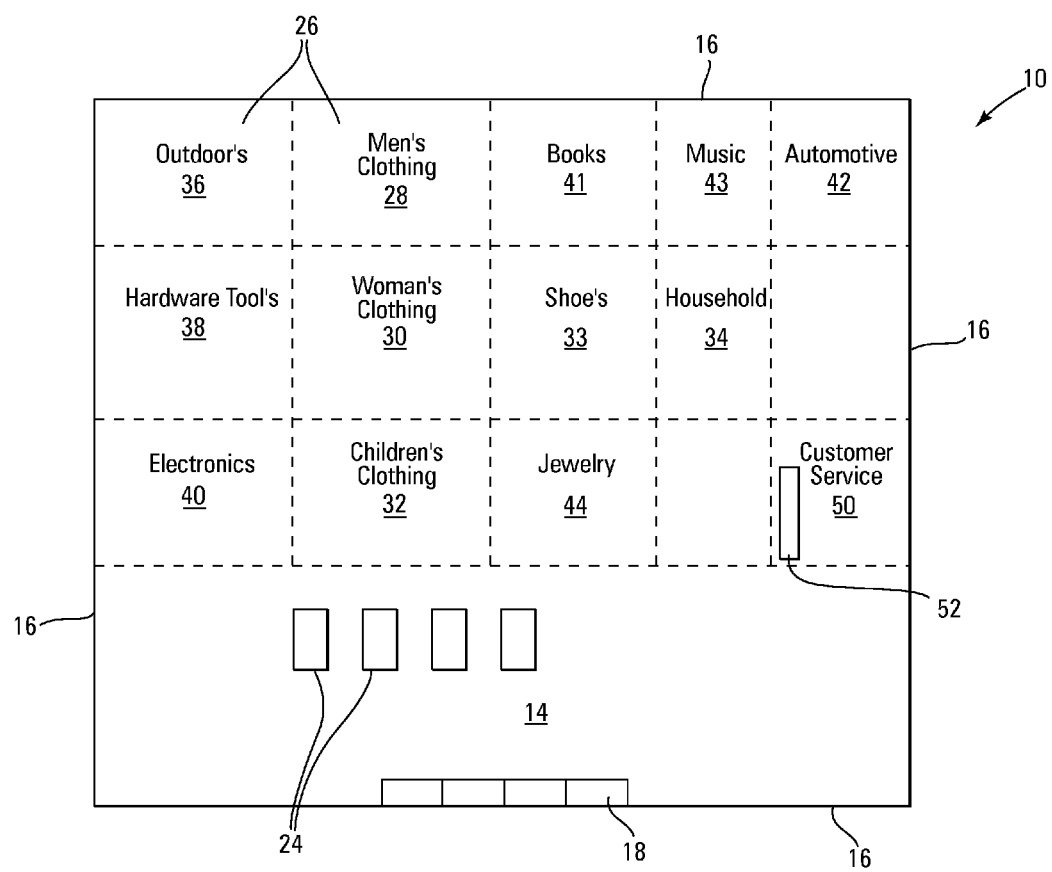
FIG. 2 is a top plan view of the store 10, showing various generic groupings or departments 26 that contain merchandise that may be sold in the store 10 in accordance with the present invention.

As shown in FIG. 2, the store 10 may include one or more checkout stations 24 where the consumer can complete the purchase transaction. At a checkout station 24, money or its equivalent may be exchanged for ownership of the merchandise purchased. The store 10 also may be divided into various departments 26 such that each department 26 carries merchandise pertaining to a particular generic classification. For example, the store may include a "men's clothing" department 28 into which various items of men's clothing such as socks, underwear, shirts, pants, jackets, etc. are located. The store could also include other departments such as women's clothing 30, children's clothing 32, shoes 33, household 34, outdoor 36, hardware/tools 38, electronics 40, books 41, automotive 42, music 43, jewelry 44, and any other department that is commonplace in department stores such as Target, Wal-Mart, JC Penney, Marshall Field's, Ace Hardware, Kmart, and Sears. The store may also include a customer service department 50, which has a service counter 52 for handling questions, returns, and the like.

Examples of various department and items of merchandise that maybe found in the store include: "housewares" containing, for example cookware, blenders, toasters, mixers, knives, plastic cups, candles, frames, bowls and glassware; "entertainment' containing items such as stereos, DVD and televisions; "appliances" containing items such as washers, dryers, ranges, and refrigerators; "hardware/tools" containing items such as hammers, tool cases, wrenches, jacks, drills, tool cases, chisels, compressors, saws, tool bags, hoses, aprons and fasteners such as screws, bolts, and fittings; "automotive" containing items such as polishes, auto parts, cloths, tools and instruments; "bath" containing items such as towels, shower curtains, shower rods, and bath rugs; "jewelry" containing items such as bracelets, rings, earrings, and watches; "small appliances" such as sewing machines, vacuum cleaners, microwaves, humidifiers, and dehumidifiers; "fitness and recreation" such as outdoor furniture, weight lifting equipment, treadmills, tents, tiki lights, and grills; "electrical" such as lights, cords, and outlets; "paint" containing items such as paints, rollers, dropcloths, trays, and brushes; "cleaning agents" containing items such as soaps, dishwashing liquids, brooms, scrub brushes, and sponges; "eyewear" containing items such as sunglasses, prescription glasses, and contact lenses; "children's clothing", "men's clothing" and "women's clothing" each containing items such as socks, pants, shirts, skirts, shorts, and underwear; "shoes" containing items such as gym shoes, running shoes, walking shoes, dress shoes, slippers, moccasins, shoe polish, leather treatments, shoe care kits, and shoe trees. The store does not necessarily need to include all of these departments, and the departments need not be as large as the departments in the stores noted above. A department store in accordance with the present invention may include about 2 to 40 departments or 3 to 20, or 4 to 15 depending on the design desired by the managers/owners.

The store could also include a "book" department that includes books published within a certain geographic area of whose author(s) reside within that particular geographic area. For example, a store that has a building located in Minnesota could include books published by Minnesota firms and/or written by Minnesota authors. Similarly, a music department could include CDs that contain songs that are produced in Minnesota and/or written and/or performed by artists who reside in Minnesota. The store could include a space where authors and artists can sign and promote new releases. In the case of musicians, the store may allow local artists to perform their music for customers in or around the store building. The store could also sell items outside the building such as plants raised in a nearby designated region or automobiles made at a relatively close manufacturing location.

If desired, the store could focus exclusively or predominantly on locally made merchandise. Alternatively, the store may contain a department that particularly specializes in locally made merchandise. Rather than have locally made merchandise interspersed with other merchandise of a particular generic department, the store could have merchandise that is purchased on a point-of-origin basis located in one or more departments that are noted for having locally made products. Such an arrangement would be akin to a grocery store where organic food products are all found one set department rather than being interspersed throughout the various generic departments of the store. In one embodiment, at least about 10% of the merchandise (volume wise) that is offered for sale by the inventive store has been purchased on a point-of-origin basis, as either a major or predominant consideration. In other embodiments, at least about 25%, at least about 50%, and at least about 75% to about 90% of the store merchandise that is offered for sale has been purchased by the store on a point-of-origin basis as a major or predominant consideration. In yet another embodiment, the store sells locally made items of merchandise at least about 10% volume wise or at least about any of the other volume wise percentages mentioned above. If the store desires to be truly pure in its point-of-origin purchasing strategy, about 100% (or nearly all) of all the items are offered for sale by the store are locally made merchandise that has been purchased by the store on a point-of-origin basis and as a predominant consideration. If the store has a building and one or more checkout stations, these percentage numbers could apply to the merchandise that is within the building as well as merchandise that is warehoused in a building for distribution to various buildings where the sales to consumers take place.

Although the store has been illustrated as including a building and one or more checkout stations in which the merchandise may be purchased, the store could alternatively be an online store that allows purchases to be made over the Internet. In this version of the store, a consumer would logon to the store's web site and would offer information (or the store would somehow obtain information) that would enable the store to ascertain the location of that particular consumer. The consumer would also inform the online store of the merchandise that the consumer is interested in purchasing, and the online store would then provide the potential consumer with one or more merchandise items that are available for sale and that are of the particular product type that the consumer is interested in purchasing. The online store also would provide the consumer with the price of the goods and any other information that would be helpful to the consumer in making their purchase decision (for example, size and colors, volume discounts, sale priced items, and the location of the manufacturer). The items would have been (or would be) purchased by the online store on a point-of-origin basis. Locally made goods of the product type that the consumer is interested in purchasing may be brought to the attention of the consumer as an operating principle of the store. As the term is used herein, "operating principle" means a written or understood and accepted policy of the store. The online store can purchase or otherwise obtain ownership of the items that are offered for sale before, after, or contemporaneously with an acceptance of an offer from the consumer. The online store may include a catalog of merchandise that is searchable online by the consumer. The online catalog may include a listing of all products that are made within the geographic area of the consumer's residence location. Much of what is said above in respect to a store that sells items from a building can be applied to an online store and is so intended in accordance with this description of the invention. The tiered basis described above also could be used by the online store when it purchases items that it offers for sale or when it furnishes the consumer with the brands that are available for purchase. The online store could advertise that it offers locally made merchandise. The online store also could offer for sale the same items of merchandise as a store that comprises a building and one-or-more checkout stations. The same percentages of merchandise offered for sale could be purchased on a point-of-origin basis. Consumers who order merchandise from the online store may do so over the Internet, through the mail, or over the telephone.

The inventive method of selling merchandise comprises: (a) purchasing a variety of merchandise wholesale on a point-of-origin basis; (b) advertising the purchased merchandise for sale, wherein the advertisement notes that the merchandise offered for sale includes locally made products; and (c) selling the purchased merchandise to consumers.

Figure 3:
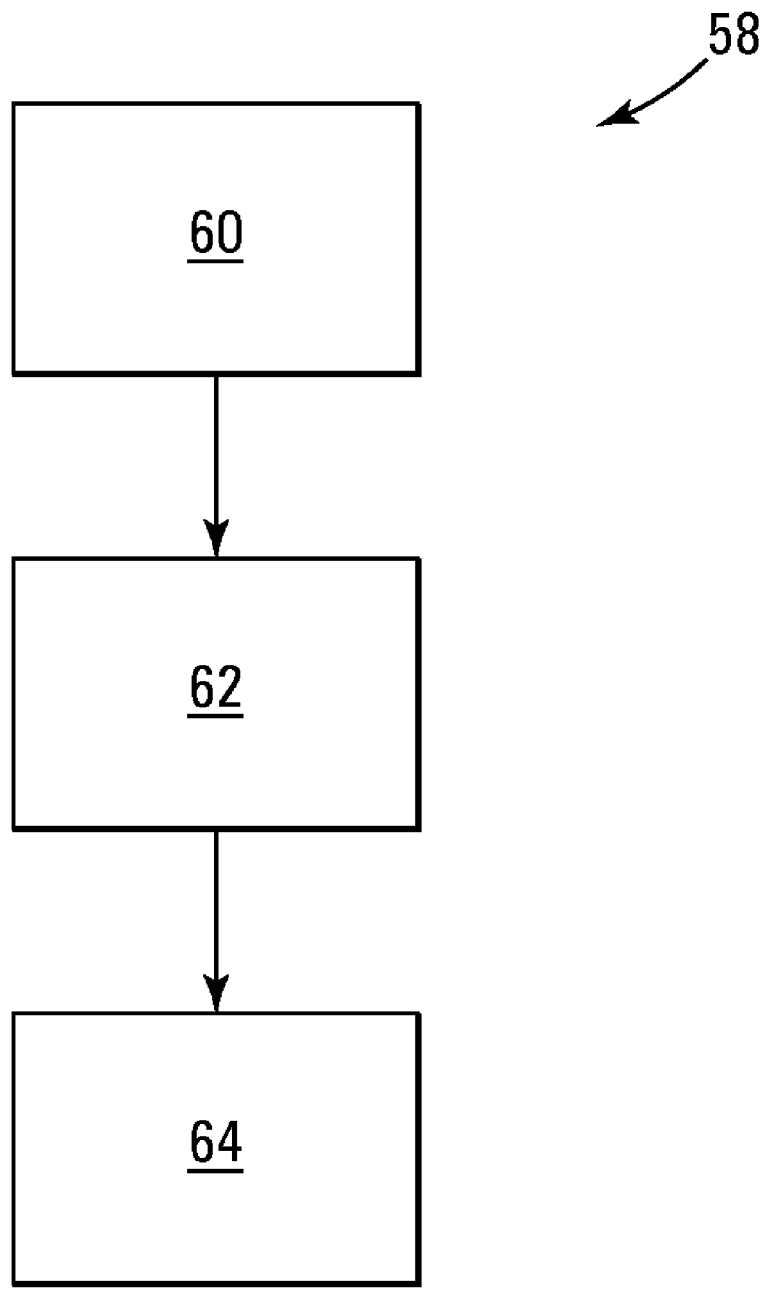
FIG. 3 is a flow chart 58, illustrating an example of a method of selling merchandise in accordance with the present invention.

FIG. 3 shows an outline 58 of the steps that may comprise the inventive method. In a first step 60, the store makes wholesale purchases of the items that it intends to sell. The store advertises this merchandise for sale 62. The advertised merchandise explains in one way or another that the merchandise that is offered for sale has been purchased on a point-of-origin basis. As indicated above, the advertisement does not necessarily have to use the words "point-of-origin basis" to convey this information. The advertisement may, for example, simply state that the store attempts to purchase merchandise that is made in the local area. The merchandise that is advertised for sale is then sold to consumers at step 64. The store may employ one or more wholesale and retail purchasers to arrange for purchase of the merchandise on a point-of-origin basis. The hired purchasers will consider the location of manufacture of the item of merchandise, when making the purchasing decision. The hired purchasers may be instructed to buy, focus on, or give priority to locally made merchandise that has a location of manufacture that is located in a geographic area that is closer to the point of sale to the consumer. In making the decision on which items to purchase for the store on a point-of-origin basis, the purchasers may be further instructed to make point-of-origin of manufacture a major or even predominant consideration in making the purchase on behalf of the store. As indicated above, the consumer purchases could be made in a building that has a checkout station, online, or by mail order. In either instance, a credit card can be used to complete the purchase. If the transaction is done in person, the payment could be easily made by cash or check. In an online situation, Pay Pal® could be used, for example, to submit payment to the store. Purchases may be made using, for example, the system described in U.S. Pat. No. 5,960,411 to Hartman et al. In the Hartman et al. method, an order may be placed by a purchaser on the internet whereby the purchaser uses a client's system and the order is received by a server system. The server system receives purchaser information including identification of the purchaser, payment information, and shipment information from the client's system. The server system then assigns a client identifier to the client system and associates the assigned client identifier with the received purchaser information. The server system sends to the client system the assigned client identifier in an html document identifying the item and including an order button. The client system receives and stores the assigned client identifier and receives and displays the html document. In response to the selection of the order button, the client system sends to the server system a request to purchase the identified item. The server system receives the request and combines the purchaser information associated with the client identifier of the client system to generate an order to purchase the item in accordance with the billing and shipment information whereby the purchaser effects the ordering of the product by selection of the order button.

Figure 4:
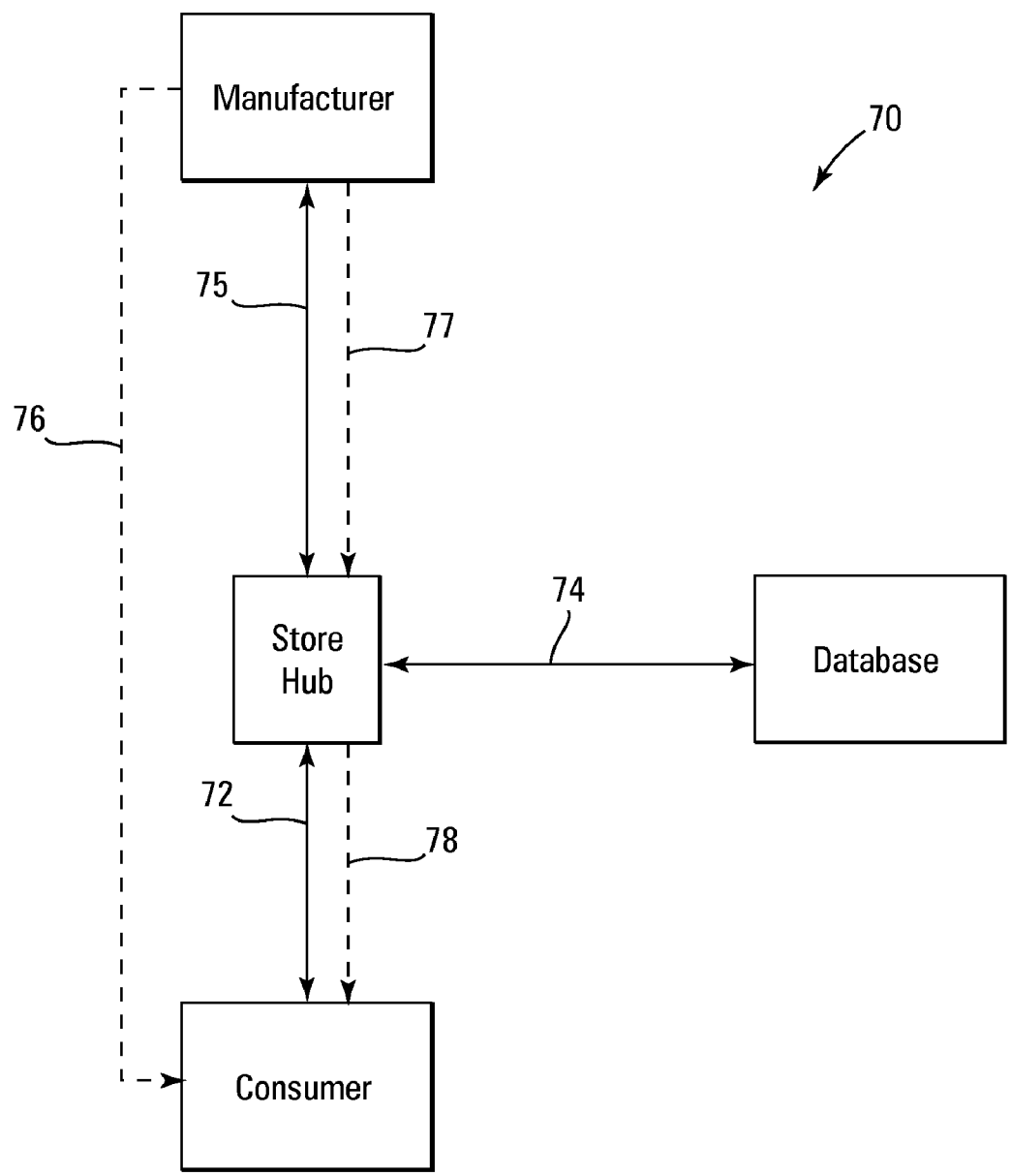
FIG. 4 is a plan view of an example of an online store system 70 in accordance with the present invention.
Figures 5A, 5B:
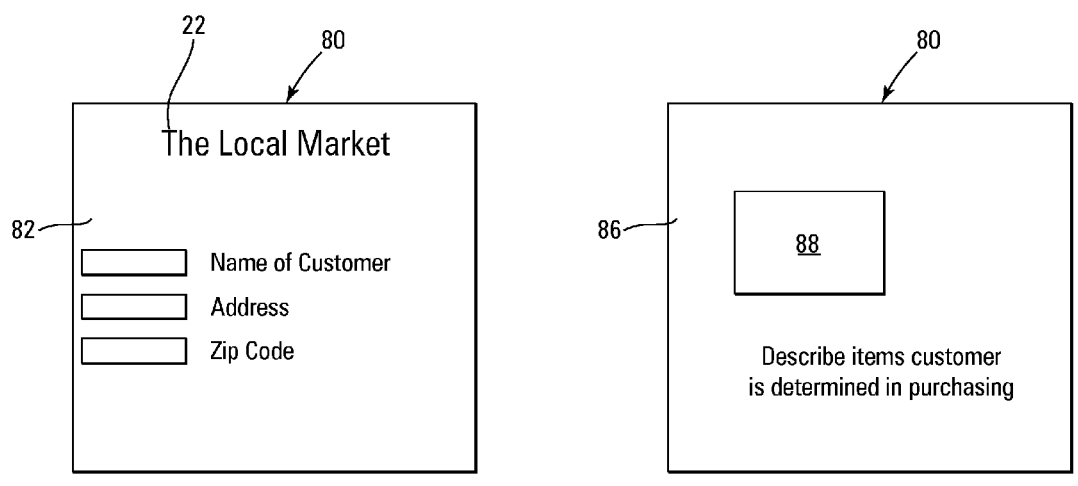
FIGS. 5a and 5b show an example of a web site 80 that can be used by a consumer to obtain locally made merchandise in accordance with the present invention.

FIG. 4 shows an example of an online store system 70 that comprises an electronic interface 72 with an online consumer(s) and an electronic interface 74 with a database. The electronic interface 72 may occur at least in part through a website 80 (FIGS. 5*a* and 5*b*). The interface 72 is capable of transmitting an online consumer inquiry regarding one or more items of merchandise (such as one or more product types) that a consumer is interested in purchasing from the online store to the store hub and is capable of responding to the inquiry with information pertaining to the merchandise (such as product type(s)) that are offered for sale. The database contains information pertaining to at least a super-multiple of product types and the location of manufacture, in whole or in part, of the product types. The electronic interface 74 is capable of furnishing the store hub with information that includes locally made products of the kind that the consumer has inquired about. The store hub will, via the electronic interface with the consumer at the website, or via an e-mail, respond to the consumer inquiry with merchandise information that includes the product(s) brands that are available for sale from the online store and the location of manufacture these brands such that the consumer has the ability to select a locally made product for purchase. If the consumer is not satisfied with the brands that have been supplied to it electronic interface 72, the consumer can be supplied with an option to expand the search into other geographic areas. Alternatively, the consumer could be allowed to insert the name of a particular brand that the consumer is interested in purchasing. The store hub could respond to the consumer's request by noting the availability of such brand and by furnishing the consumer with manufacturing location information. The store hub could inform the consumer that there are other brands available that are made geographically closer to the consumer's residence information. The store hub can also interface 75 electronically with the manufacturer or wholesale supplier through the internet to instruct the manufacturer or wholesale firm to send the purchased item to the consumer as noted by broken line 76. Alternatively, the purchased item could be sent to the store hub as noted by the broken line 77 and then to the consumers as noted by line 78. In another variation of this embodiment, the consumer can be directed to a website of the manufacturer (or wholesale firm) where the consumer may shop for merchandise and complete purchases. The online store may receive compensation from the manufacturer in the form of a commission for each completed sale or for each person who visits the manufacturer's (or wholesale firm's) website as a result of an earlier visit to the online store's website.

FIGS. 5*a* and 5*b* show an example of a web page 82 that can be located on a web site 80. The web page 82 includes indicia 22 that references the name of the web site, in this case "The Local Market". Persons who are interested in making purchases from the online store can insert information that includes residence information such as an address, ZIP code, or combination thereof. Web page 82 or another web page 86 could provide one or more spaces 88 for inserting information pertaining to the product types that the consumer is interested in purchasing.

Figure 6:
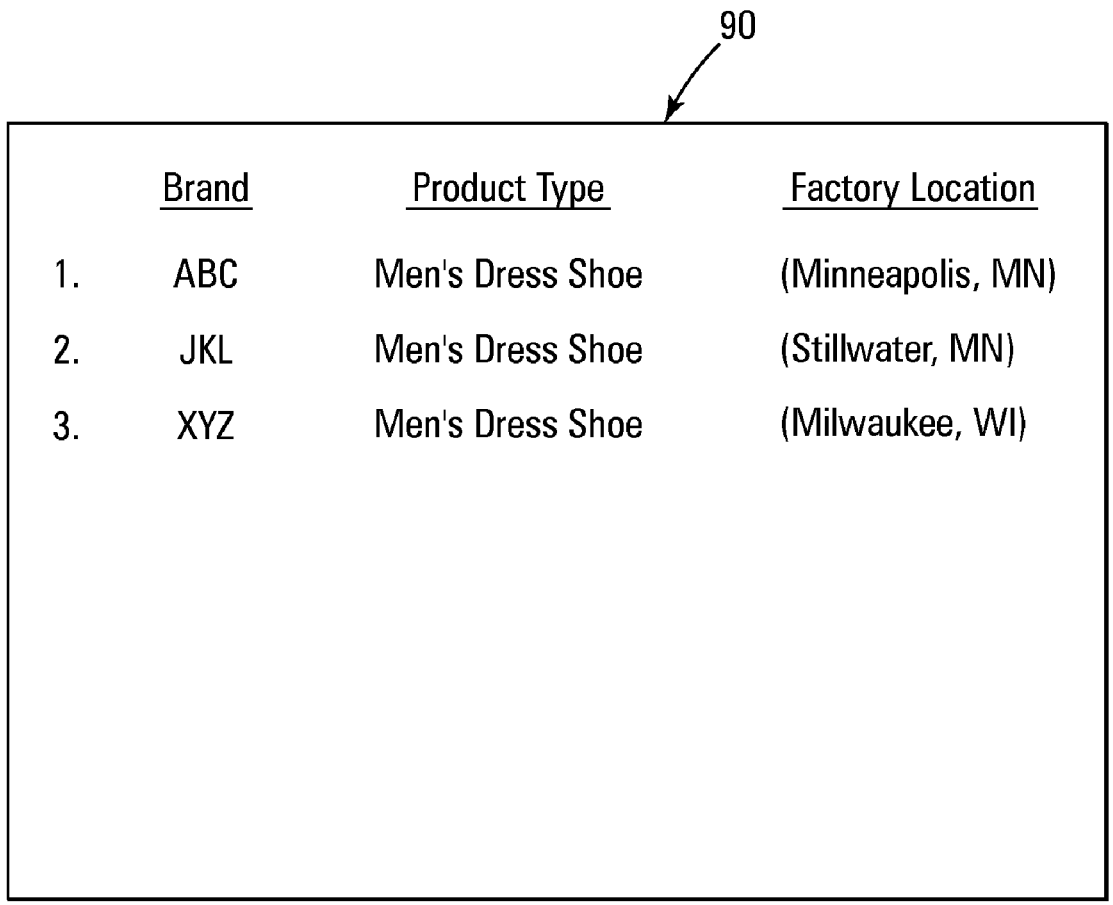
FIG. 6 shows an example of a reply on web page 90 that a consumer may obtain in response to an inquiry for a particular product type when shopping for certain merchandise at an online store in accordance with the present invention.

FIG. 6 shows an example of a web page 90 that includes a response to the consumer's inquiry regarding the availability of product types that the consumer is interested in purchasing. As shown, the response includes three particular brands of men's dress shoes that are available for purchase. The first brand on the list is the ABC brand, which is noted as being manufactured in Minneapolis, Minn. The second and third brands on the list are the JKL and XYZ brands, which are noted as being made in Stillwater, Minn., and Milwaukee, Wis., respectively. In this particular instance, the consumer told the online store that he or she was interested in purchasing a men's dress shoe. The consumer inserted residence information for Minneapolis, Minn. By clicking on one of the three brands displayed on the web page 90, the consumer can obtain further information regarding various dress shoes that are available from each entity. As indicated above, this information may be obtained from a website of the online store or from a website of the manufacturer. Ultimately, the consumer will be able to make a choice regarding the particular brand, kind, size, color, etc. of men's dress shoe that the consumer would like to purchase. If the consumer cannot find a suitable shoe from the list provided on web page 90, the consumer may be provided with an opportunity to expand the search into a larger geographic area or to search for a particular brand of the consumer's liking. The consumer also could be provided with the ability to search for a particular brand or manufacturer at the outset.

The inventive store may also include a mail order store where consumers can buy locally made goods by examining a paper catalog. In such instance, the paper catalog can be mailed to residents who live within the area assigned to that particular catalog. For example, the mail order store can produce a number of catalogs, each representative of merchandise made within a particular geographic region of, for example, the United States of America, Canada, or Mexico. A catalog could be produced for each province or state in Canada or Mexico. In the United States, the catalog could be produced for the Pacific coastal states, the Rocky Mountain states, the Upper Midwest states, the lower Midwest states, the Northeast, and the Southwest. The catalogs would tend to focus on products made in those regions, or in those countries in which the regions reside if the products cannot be located in those regions, or in the whole of North America the products cannot be located in any of the respective nations. Thus, the mail order catalog can also use the tiered basis purchasing strategy outlined above when deciding what products to show in its catalog. Consumers who make purchases from the mail order catalog can do so through the mail, via telephone, or over the Internet. The other features and aspects of the invention, which have been described above with respect to the store that has a building and the online store can be equally applied to the mail order store to the extent possible.

The items of merchandise that are sold in the store, through mail order, or on line may also include a point system that allows the consumers to quickly understand the degree of contribution of persons within a certain geographic area. Using such a system, a ranking is identified with the particular item of merchandise. The ranking system would be reflective of the degree of human contribution to the creation, manufacture, distribution, et cetera of the product. Because an item of merchandise can be, for example, manufactured in a variety of locations, it is difficult for consumers to presently understand the degree of contribution by persons living within a certain locality. The corporate headquarters of a particular business could, for example, be located in the same town as the residence of the consumer, but the manufacturing could be done in another nation. The location of the finance persons and marketing persons could also be located in a different region. Thus, if a consumer cannot find a product that is made locally, they would probably prefer to buy a product that is being sold by a company that keeps its corporate headquarters in a nearby location or that uses local persons for research and development or preparing the packaging, advertising, et cetera. To enable consumers to quickly and better understand the degree to which persons in their area or, within a certain defined geographic region, contributed to the article, a point system can be used for this purpose. For example, a ranking of 1 to 5 (or a, b, c, d, e) or any other form of indicia such as a graph, scale, et cetera could be used for this purpose. The ranking would be different from the common explanation "Made in the USA" or "Made in the _____ of _____ components." The ranking system would give an allocation to the location of manufacture along with other human contributions. A certain allocation can be given to the product based on where the starting materials for the product are made or mined, the extent and location of the manufacturing, the location of research and development, the location of the corporate headquarters, the location of marketing persons, the location of finance persons, the location of quality control persons, the location of various administrators, et cetera. The system could use a particular formula or method for providing allocations to determine the ranking. Ultimately, a ranking is provided to each item of merchandise under the point system. The ranking preferably is objectively and/or uniformly provided. The ranking could use human hours as a factor in developing the ranking. The ranking is then displayed on the product or on the packaging into which the product is contained so that the consumers can quickly identify the extent to which human contribution has been made within a particular geographic area. The ranking system also may be applied to various geographic areas. For example, the product packaging could display a ranking for the city, county, state, region or province, nation, et cetera (as for example identified above) and each of these particular geographic areas can be given a ranking. If, for example, the product is wholly created within the state to which the product is sold, that product could have the highest ranking of say 5 or 10, depending on what scale is selected. If only half of the human contribution is made within that particular geographic region, the ranking could be reduced by approximately 50%. Consumers could then see that a product is, for example, made 50% within their state and another 50% within the United States or North America. The ranking system does not need to have to use numbers or letters but also could use symbols such as bars, lines, or colors. The ranking could also be displayed on the shelf onto which the item of merchandise rests in the store of it could be obtained on a web page or in the shopping catalog. Thus, there can be a multitude of means for associating the ranking with the product.

Although the inventive store in all instances has been described as being a store that sells merchandise, the store could also sell other items such as food and produce. The following Examples have been selected merely to further illustrate features, advantages, and other details of the invention and therefore should not to be construed in a manner that would unduly limit the scope of this invention.

EXAMPLE 1

A building is used to house many items of merchandise. The building is decorated to include a variety of departments where each department is labeled using indicia to identify a particular department. In the instance of this hypothetical example, the building has men's, woman's, and children's clothing departments, a household department, and an outdoor department. The building also includes one to three operational check-out stations and a customer service counter. The building has a sign on it, which displays the name of the store. The store has a couple of purchasing agents, one who makes household and outdoor purchases on behalf of the store and another who makes clothing purchases. Each purchasing agent operates within the store's company policy of buying merchandise on a point-of-origin basis and on a tiered basis. In so doing, each purchasing agents looks to purchase merchandise in a designated geographic area, in this case, the county of the location of the building and the state into which the building is located, as at least a major consideration. Another tier in the purchasing strategy includes the borders of the United States of America. The store advertises on-line and in the newspapers, telling potential customers that the stores has a policy of stocking at least about X % of merchandise that is made in the United States of America, where about y % is made in the state of origin, and about Z % is made in the county of origin.

EXAMPLE 2

A purchasing agent for a store is assigned responsibility for purchasing shoes at the store. The store is located in Minneapolis, Minn. The purchasing agent operates under the store's guidelines to first look for manufacturers that are located in the state of Minnesota and finds Red Wing Shoes located in Red Wing Minn. This shoe manufacturer makes work boots and shoes and motorcycle boots. The shoe manufacturers do not produce dress shoes. The purchasing agent looks for dress shoes in the neighboring states and locates Allen Edmonds made in Port Washington, Wis. The purchasing agent needs to locate a manufacturer of woman's dress shoes and sandals. The agent finds Chaco™ sandals made in Colorado. The search continues for a manufacturer of woman's dress shoes. This store shops for merchandise using tiers that include the state, neighboring states, and the United States. The store ascertains the rankings for each of shoes and this ranking is associated with the shoe under a point system. The ranking is displayed alongside the shoe in the store.

This invention may take on various modifications and alterations without departing from the spirit and scope thereof. Accordingly, this invention is not limited to the above-described but is to be controlled by the limitations set forth in the following claims and any equivalents thereof.

This invention also may be suitably practiced in the absence of any element not specifically disclosed herein.

All patents and patent applications cited above, including those in the Background Section, are incorporated by reference into this document in total. To the extent that there is a conflict, the present specification will control.

What is claimed is:

1. An online store that comprises:
a website that offers a variety of merchandise for sale to consumers through electronic interface with the website, the website allowing for a consumer to input their residence information and an inquiry for a desired product type, wherein the variety of merchandise that is offered for sale to the consumers has been manufactured by a plurality of manufacturers and is made available to the consumer for purchase on the website such that locally made items of a particular product type are brought to the attention of the consumer on the website relative to the consumer's previously inputted residence information and in response to the consumer inquiry for the particular product type.

2. The online store of claim 1, wherein the websites electronically interfaces with a database that contains information pertaining to a super multiple of product types, the interface allowing for the website to display a list of product brands located closer to the consumer residence information than other product brands in the database of the inquired product type.

3. The online store claim 2, wherein the merchandise that is offered for sale has been made by multiple manufacturers.

4. The online store claim 3, wherein the merchandise that is offered for sale at the online store has been made by a super multiple of manufacturers.

5. The online store of claim 1, wherein the website is adapted to display a plurality product brands that are available for purchase in response to the consumer inquiry for the particular product type, the displayed product brands having location of manufacture that is located closer to the consumer's residence information than the non-displayed product brands in the database.

6. The store of claim 5, wherein the consumer has an option on the website to expand the list of displayed product brands to a larger geographic area than the first inputted inquiry.

7. The online store of claim 1, wherein the merchandise that the online store offers for sale is available for searching on a point-of-origin basis.

8. The online store of claim 7, wherein the location of manufacture of the locally made items of the particular product type is displayed on the website in response to the consumer inquiry for the particular product type.

9. The online store of claim 1, wherein the online store includes a catalog of merchandise that is searchable on a point-of-origin basis.

10. The online store of claim 1, comprising an electronic interface with a database that can furnish the website with a listing of one or more items of the product type that the consumer has inquired about.

11. The online store of claim 1, wherein the merchandise that the online store offers for sale is available for searching by the consumers on a point-of-origin basis, and locally made merchandise, relative to the consumer's residence information, is first displayed on the website as a list of one or more product brands in response to the consumer inquiry.

12. The online store of claim 1, wherein a point system is used to provide a ranking for the variety of items of merchandise.

13. The online store of claim 12, wherein the point system associated with the items of merchandise results in a ranking being displayed on the website for each displayed item on the website in response to the consumer inquiry.

14. The online store of claim 1, wherein the store advertises to consumers on its website that the online store offers locally made merchandise for sale.

15. The online store of claim 1, wherein the locally made items of merchandise are intentionally brought to the attention of the consumer as an operating principle of the online store.

16. The online store of claim 1, wherein the residence information comprises a ZIP code, and wherein the locally made items of the particular product type that are brought to the attention of the consumer on the website are displayed relative to the inputted ZIP code.

17. An online store that comprises:
(a) a store hub;
(b) an electronic interface with online consumers via a website, which interface is capable of transmitting an online consumer inquiry regarding one or more product types that a consumer is interested in purchasing from the online store to the store hub and is capable of responding to the inquiry with information pertaining the product brands that are offered for sale online; and
(c) an electronic interface with a database that contains information pertaining to at least a super-multiple of product types and the location of manufacture in whole or in part, of the brands within the super-multiple of product types, the electronic interface being capable of furnishing the store hub with information that includes locally made products brands, relative to the consumer's residence information, of the product type that the consumer has inquired about;
wherein the store hub will, via the electronic interface with the consumer at the website, or via an e-mail, respond to the consumer inquiry regarding the one or more product types with information that includes the product(s) brands that are available for sale from the online store such that the consumer has the ability to select a locally made product brand for purchase, the response to the consumer inquiry being tailored to first display product brands made geographically closer to the consumer's residence information than other brands of the same product type.

18. The online store of claim 17, wherein the store advertises to consumers on its website that the online store specializes in the sale of locally made merchandise.

19. The online store of claim 17, which online store further comprises a point system.

20. The online store of claim 19, wherein the point system comprises a ranking that includes an indicia that comprises units from one to five.

* * * * *